United States Patent [19]
Clausen

[11] Patent Number: 5,396,937
[45] Date of Patent: Mar. 14, 1995

[54] ROUTER TABLE

[76] Inventor: Allen H. Clausen, 823 Tumbleweed La., Fallbrook, Calif. 92028

[21] Appl. No.: 182,351

[22] Filed: Jan. 18, 1994

[51] Int. Cl.⁶ .............................................. B27C 5/00
[52] U.S. Cl. ................................... 144/134 R; 144/84; 144/134 A; 144/252 R; 144/253 R; 144/253 J; 409/137
[58] Field of Search ........... 144/84, 87, 134 R, 134 A, 144/145 A, 252 R, 253 R, 253 J; 409/137, 182

[56] References Cited

U.S. PATENT DOCUMENTS

| | | | |
|---|---|---|---|
| 4,163,465 | 8/1979 | Strong | 144/87 |
| 4,509,572 | 4/1985 | L'Archer | 144/84 |
| 4,749,013 | 6/1988 | Ducate, Sr. | 144/84 |
| 4,763,706 | 8/1988 | Rice et al. | 144/84 |
| 4,884,604 | 12/1989 | Wirth, Jr. | 144/84 |
| 4,940,067 | 7/1990 | Beard | 144/84 |

Primary Examiner—W. Donald Bray
Attorney, Agent, or Firm—J. E. Brunton

[57] ABSTRACT

An improved router table for removably supporting a normally hand-held, portable router which enables precise angular cuts to safely be made on a workpiece without the need for special fixtures and with the workpiece remaining flat in the upper surface of the router table top. Such cuts can safely be made on a workpiece by simply angularly adjusting an angularly movable part of the apparatus table top relative to a stationary part thereof. A protractor scale is provided for accurately measuring and recording the angular position of the movable part of the table top. The device also includes a novel calibrated crossfeed mechanism which permits the cutter bit to be controllably fed toward and way from the workpiece.

18 Claims, 3 Drawing Sheets

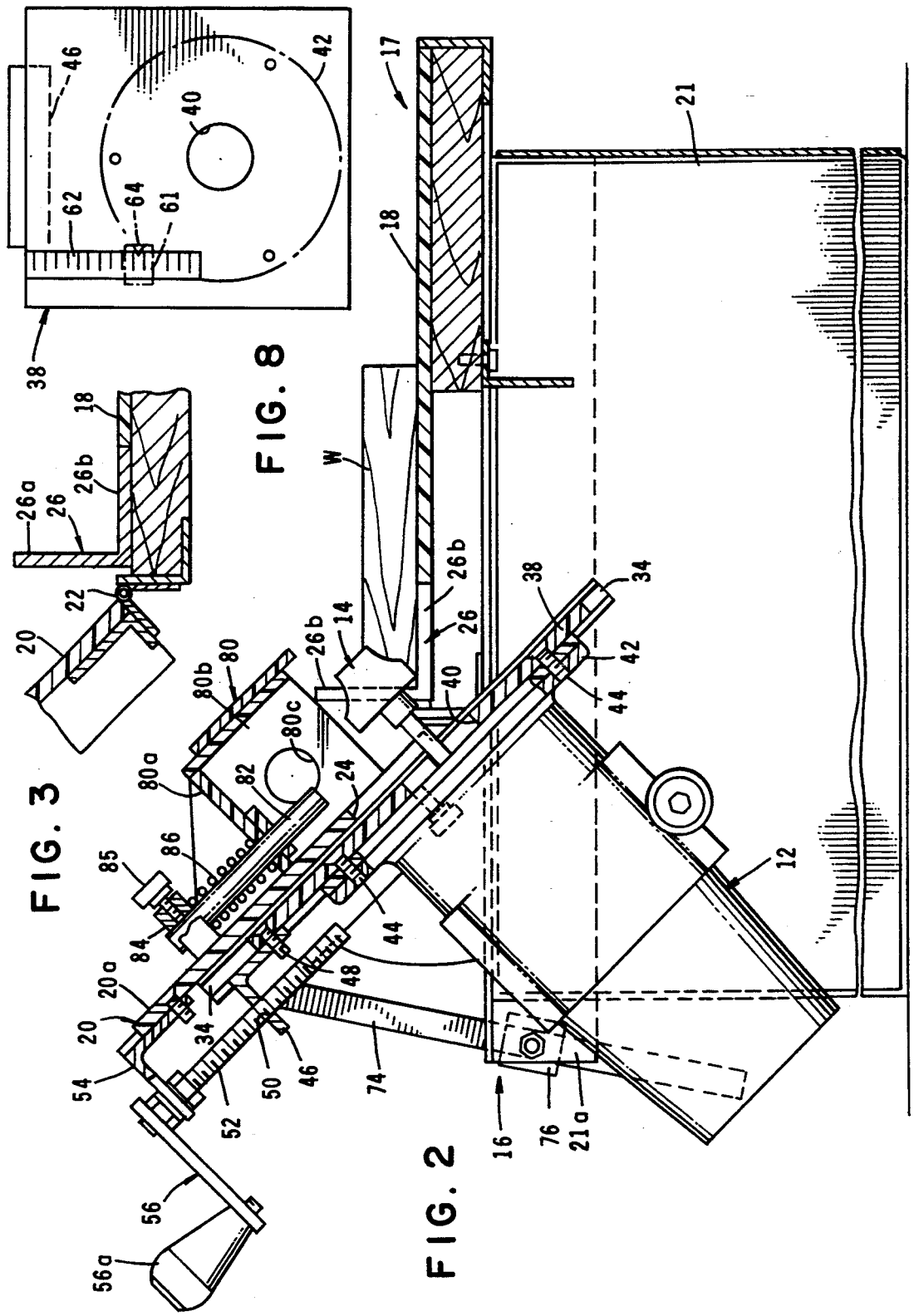

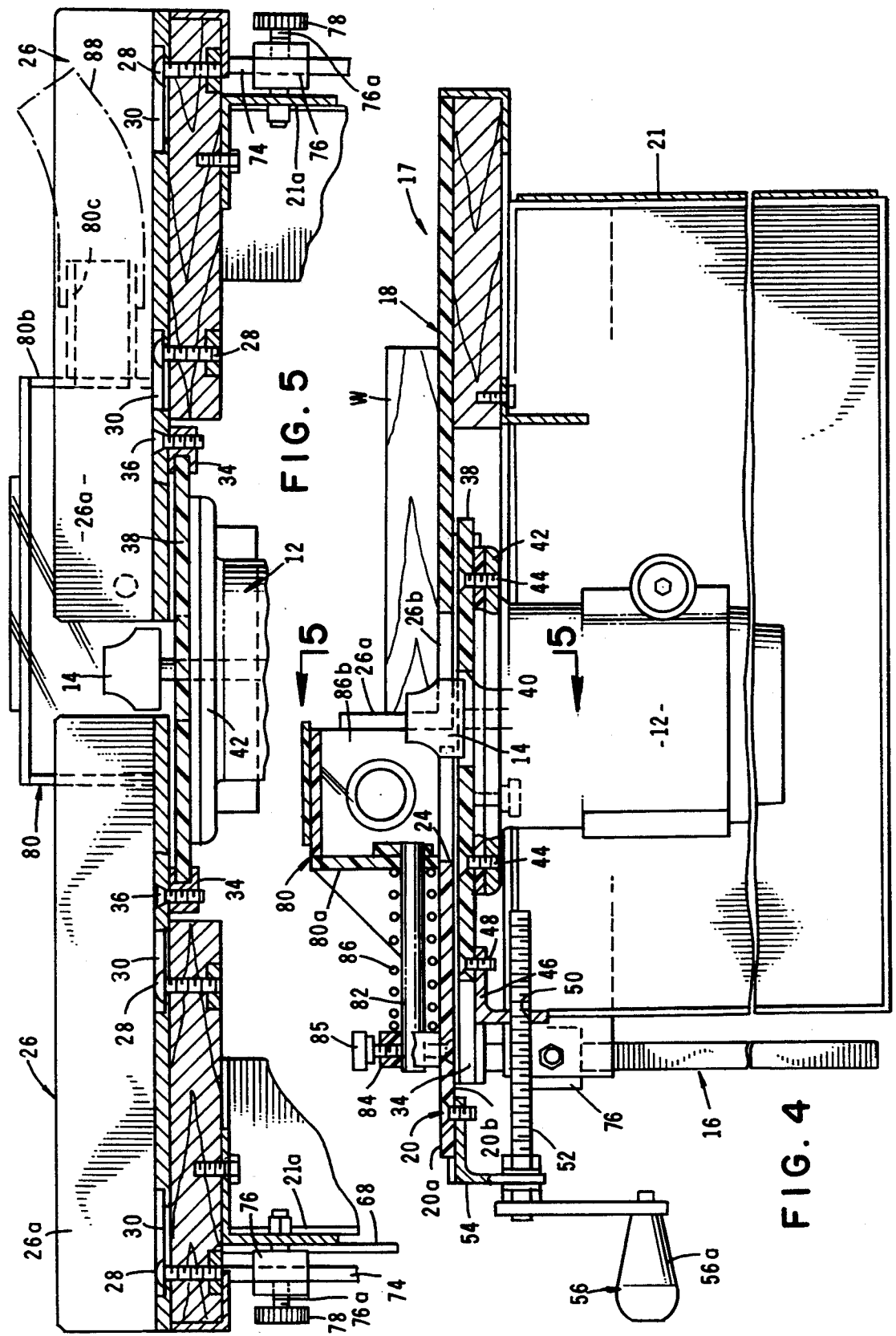

ROUTER TABLE

BACKGROUND OF THE INVENTION

1. Field of the Invention

The present invention relates generally to router tables. More particularly, the invention concerns a router table of novel construction that permits precise tilting and cross-feed of the router relative to the workpiece.

2. Discussion of the Invention

In the past, several types of supporting tables have been suggested to which a normally hand-held, portable router can be removably connected. Typically, these prior art tables comprise a flat, generally horizontally extending top which is supported on legs. The top has an upper planar surface which supports the workpiece during cutting operations and an undersurface to which the normally hand-held portable router is removably attached. A hole extends through the top to receive a cutter bit which is mounted within a collet provided on the router. With this construction, the axis of the cutter bit extends substantially perpendicular to the plane of the workpiece supporting surface of the table top. While the cutter bit can be raised or lowered relative to the top by a depth of cut adjustment on the router, the angle of the cutter bit relative to the table is not adjustable. Therefore, if angle cuts are to be made on the workpiece, the workpiece itself must be angled relative to the upper planar surface of the table top. This can be both cumbersome and dangerous.

To maintain the workpiece in position relative to the cutter bit, some prior art router tables are provided with elongated fences that are connected to the top so that they can be moved laterally of the table top toward and away from the cutter bit. Typically, the fence is positioned relative to the cutter bit using a ruler or some other measuring device. This method of positioning the fence is time consuming and often quite imprecise. It can also be extremely dangerous if the router is energized during the fence positioning step.

The apparatus of the present invention overcomes many of the drawbacks of the prior art router table by providing a novel two-piece table top that permits the router bit to be precisely and controllably moved relative to the workpiece through an angle of zero to ninety degrees. The apparatus also includes a unique calibrated, cross-feed mechanism that permits the router bit to be precisely and controllably fed toward the workpiece.

Due to the novel construction of the apparatus of the invention, the workpiece always remains flat on the upper surface of the table during all cutting operations. Nevertheless a large variety of precise angle cuts can easily be made on the workpiece in a safe manner without the use of special jigs and fixtures. Additionally, the workpiece can be precisely beveled at any angle without the need for elaborate fixtures or special cutter bits. Because both the crossfeed and angular adjustment mechanisms of the device are calibrated, precise measurements can be recorded during special set-ups to enable the set up to be readily repeated. Further, because of the unique design of the apparatus, multiple passes can be made without the necessity of relocating the fence.

SUMMARY OF THE INVENTION

It is an object of the present invention to provide an improved router table for removably supporting a normally hand-held portable router which enables precise angular cuts to safely be made on a workpiece without the need for special fixtures and with the workpiece remaining flat in the upper surface of the router table top.

Another object of the invention is to provide a router table of the aforementioned character in which a very large number of different types of angular cuts can safely be made on a workpiece by simply angularly adjusting the angularly movable part of the table top relative to the stationary part thereof.

Another object of the invention is to provide a router table as described in the preceding paragraphs which includes a protractor scale for accurately measuring and recording the angular position of the router bit relative to the upper surface of the stationary portion of the table top.

Another object of the invention is to provide a router table which includes a calibrated cross-feed mechanism which permits the cutter bit to be controllably fed toward and away from the workpiece.

Another object of the invention is to provide a router table of the class described which eliminates the need for high router fences.

Another object of the invention is to provide a router table which can be used to create many new profiles on the workpiece without the need for bits of special design.

Still another object of the invention is to provide a router table of the character described in the preceding paragraphs which includes a novel combination guard and dust collector that positions itself automatically when the router is tilted.

BRIEF DESCRIPTION OF THE DRAWINGS

FIG. 2 is a cross-sectional view taken along lines 2—2 of FIG. 1.

FIG. 3 is an enlarged, fragmentary, cross-sectional view of the hinge connection between first and second portions of the router table top.

FIG. 4 is a cross-sectional view similar to FIG. 2 but showing the first and second parts of the router table top in a co-planar relationship.

FIG. 5 is a cross-sectional view taken along lines 5—5 of FIG. 4.

FIG. 8 is a fragmentary plan view of the router mounting plate and cross-feed scale carried thereby.

DESCRIPTION OF THE INVENTION

Figure 1:
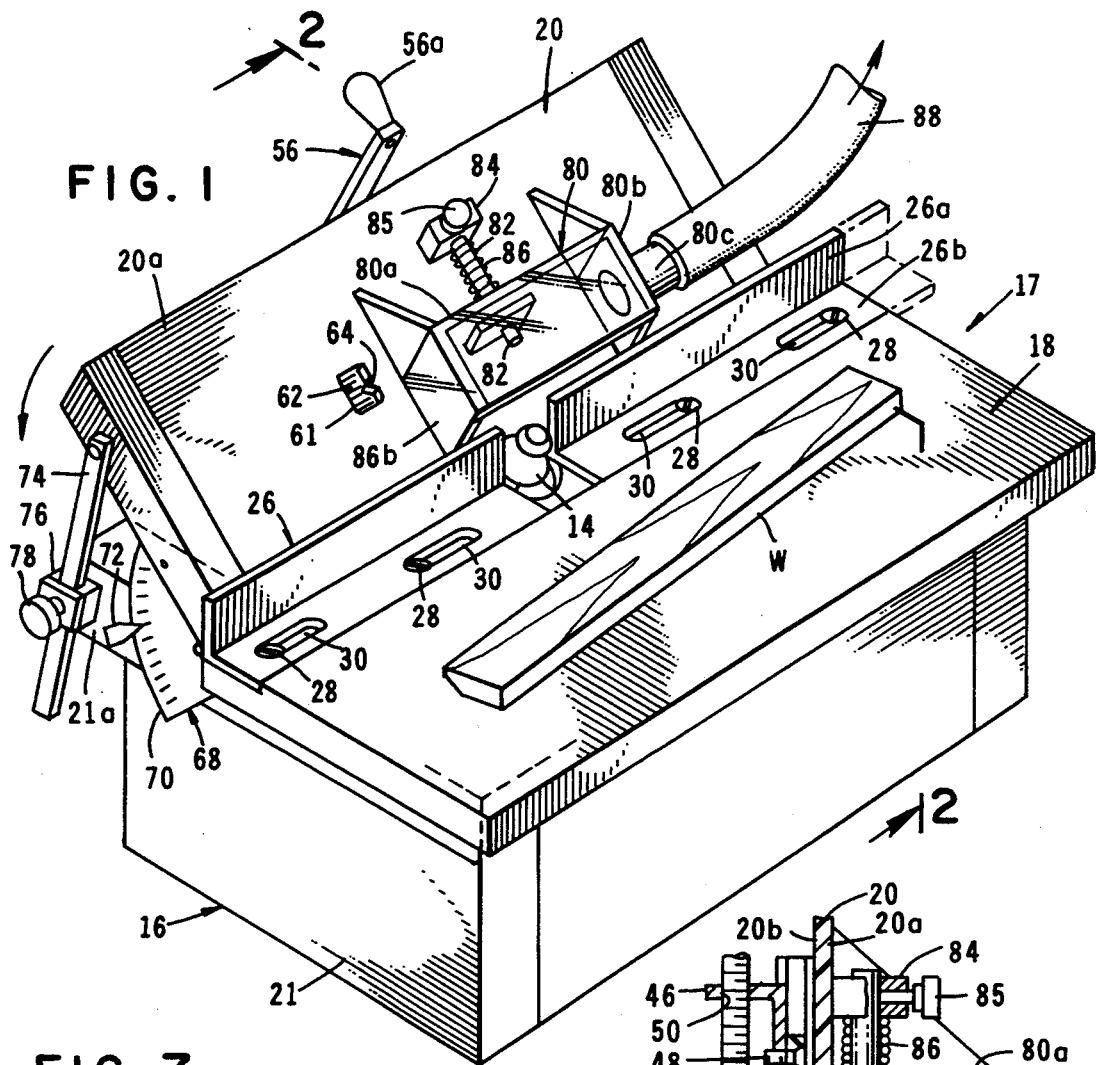
FIG. 1 is a generally perspective view of one form of the improved router table of the present invention.

Referring to the drawings and particularly to FIGS. 1, 2, 4 and 5, the routing apparatus of one form of the present invention comprises a router 12 (FIG. 2) having a rotating cutter bit 14 and a router support assembly 16 for supporting router 12. As best seen in FIG. 1, the router support assembly of the present form of the invention comprises a generally planar top 17 having first and second hingeably interconnected portions 18 and 20 respectively. Top 17 is supported in an elevated position by a support base assembly 21.

Second portion 20 of top 17 has an upper, generally planar surface 20a and a lower surface 20b (FIG. 5) and is interconnected with first portion 18 by means of an elongated hinge assembly 22 (FIG. 3). Second portion 20 is also provided with a slot-like opening 24 (FIG. 2) which receives cutter 14 so that the cutter protrudes above upper surface 20a of second table portion 20. Affixed to first portion 18 of top 17, is a workpiece guide fence 26 which, as shown in FIG. 1 is slotted so as to receive cutter 14. Fence 26 has an upstanding first portion 26a and a second generally horizontal portion 26b which is connected to first portion 18 of the table top by means of connectors 28 which are receivable within slots 30 provided in portion 26b the fence so that the fence can be moved longitudinally of the table top in the manner illustrated by the phantom lines in FIG. 1. As illustrated in FIG. 2, portion 26a functions to guide travel of the workpiece "W" relative to the cutter 14.

To interconnect the normally hand-held portable router 12 with second portion 20 of the table top, there are provided mounting means of novel construction. As best seen in FIG. 5, the mounting means here comprise a pair of spaced-apart guide rails 34 which are interconnected with table top portion 20 by means of threaded fasteners 36. Guide rails 34 are slotted so as to slidably receive a generally planar, router-mounting plate 38. As shown by the dotted lines in FIG. 8, mounting plate 38 is provided with a centrally disposed aperture 40 which receives therethrough cutter bit 14. Cutter bit 14 is rotatably connected with router 12 by means of a collet assembly of standard construction and is rotated at high speed by an electric motor housing within the outer casing of router 12. Router 12 also comprises a base plate 42 which is interconnected with mounting plate 38 by means of threaded fasteners 44.

In the present form of the invention, the mounting means also includes feed means for controllably moving mounting plate 38, along with router 12, from a first retracted position to a second extended position. The feed means here comprises an angle bracket 46 which is connected to the lower surface of table portion 20 by means of suitable fasteners 48. Bracket 46 is provided with a centrally disposed, internally threaded aperture 50 which is adapted to threadably receive an elongated threaded shaft or screw 52 which, in turn, is rotatably interconnected with top portion 20 by means of an apertured angle bracket 54 (FIG. 2). Connected to the outboard end of screw 52 is a handle assembly 56, including a handle 56a, for imparting rotational movement to screw 52. With this construction, rotation of handle assembly 56 will cause screw 52 to thread inwardly and outwardly of threaded aperture 50 of bracket 46 and, in turn, will cause mounting plate 38 to slide within tracks 34 in a manner to controllably move cutter bit 14 toward and away from workpiece "W".

The feed means of this form of the invention, also includes measuring means for measuring the extent of travel of mounting plate 38 and of the router 12 which is attached thereto. In this regard, as best seen in FIGS. 1 and 8, top portion 20 is provided with a viewing aperture 61 which permits viewing of an elongated, calibrated scale 62 that is mounted on mounting plate 38 proximate the viewing aperture. Extending into the viewing aperture 61 is a pointer element 64 which can be aligned with the calibrations on scale 62 so that the extent of travel of the mounting plate can be determined and recorded as may be required during the advancing and retracting of the cutter bit relative to the workpiece.

Figure 7:
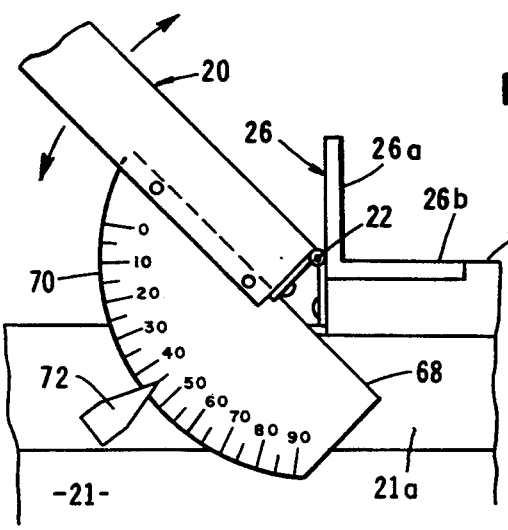
FIG. 7 is an enlarged, fragmentary, side-elevational view of the left-hand rear portion of the apparatus as viewed in FIG. 1 showing the means for determining the angular relationship between the first and second portions of the table top.

Referring now to FIG. 7, it is to be noted that the apparatus of the present form of the invention also includes measuring means for measuring the angle between first and second portions 18 and 20 of top 17. This measuring means is here provided in the form of a calibrated protractor scale 68 which includes angularly spaced indicia markings 70. As shown in FIG. 7, protractor scale 68 is interconnected with second portion 20 of the table top and moves therewith as portion 20 is tilted relative to portion 18. Connected to a rearwardly extending angle bracket 21a of supporting base 21 is an indicator element or pointer 72 (FIG. 1) which can be used in conjunction with scale 68 to determine the angular orientation between portions 18 and 20 of top 17. Using pointer 72 and scale 68, the precise angular relationship between the top portions can be determined and recorded during any particular set up prior to performing an angle cut on the workpiece "W". As indicated in FIG. 1, portion 20 of the table top can be securely locked in position at any selected angular orientation by means of a locking means here comprising a pair of elongated supporting struts 74 which are pivotally connected at each margin of table top portion 20. Struts 74 are slidably received within guide blocks 76 which are interconnected with brackets 21a in the manner shown in FIGS. 1 and 5. Blocks 76 threadably receive locking thumb screws 78 which can be rotated in a manner so that the ends of shafts 76a thereof move into clamping engagement with struts 74 in a manner to maintain top portion 20 in any desired angular relationship with respect to top portion 18.

Also forming an important aspect of the apparatus of the present invention is a combination guard and dust collecting means for guarding the rotary cutter and for collecting particulate matter generated by the cutter as it cuts into the workpiece "W". This guard and dust collecting means is here provided in the form of a hollow housing 80 which is preferably constructed of clear lucite, or the like and is slidably connected to portion 20 of top 17 for movement toward and away from fence 26. Rear wall 80a of housing 80 is apertured to slidably receive a guide rod 82 which extends outwardly from an apertured mounting block 84 which is connected to the upper surface 20a of table top portion 20. Biasing means are provided to continuously urge housing 80 away from mounting block 84 and toward fence 26 in the manner shown in FIGS. 1 and 2. This biasing means here comprises a coiled spring 86 which surrounds guide rod 82 and is disposed between mounting block 84 and apertured rear wall 80a of housing 80. A locking set screw 85 is threadably received within mounting block 84 (FIG. 2) and functions to lock rod 82 in a selected position within the apertured guide block so as to permit adjustment of the guard relative to the fence. With the construction thus described, as the second portion of the table top is tilted, the guard can readily be correctly positioned relative to the cutter against the urging of spring 86. During cutting operations, spring 86 will automatically continuously urge the guard toward fence 26.

As indicated in FIG. 1 and 2, one of the two side walls, 80b of housing 80, is apertured to receive a connector tube 80c to which a vacuum hose 88 can be interconnected. Hose 88 can, in turn, be interconnected with a vacuum unit of a character well known in the art (not shown). With this construction, particulate matter generated by the cutter during cutting operations on the workpiece will be directed into hollow housing 80 and will then be safely carried away therefrom to the vacuum unit via vacuum hose 88.

Figure 6:
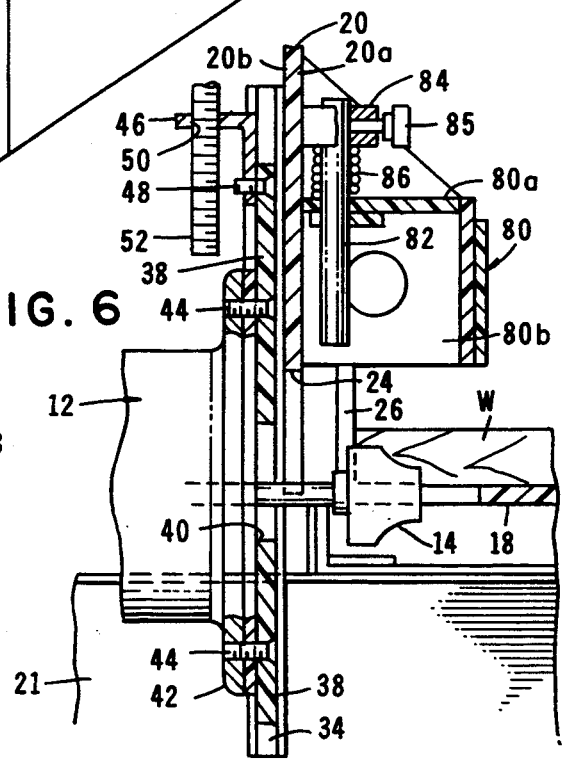
FIG. 6 is an enlarged, fragmentary, cross-sectional view of the center portion of the apparatus showing the first and second portions of the router table top in a generally perpendicular relationship.

In using the apparatus of the invention, cuts can be made on the workpiece with the apparatus in the flat position shown in FIG. 4, in the angular position shown in FIG. 2, and in the perpendicular position shown in FIG. 6. With the table top in the flat position, shown in FIG. 4, cutter 14 extends through the slotted fence 26 and into cutting engagement with the workpiece "W" in the manner shown. Through use of the cross-feed mechanism, the cutter bit can then be readily moved toward and away from the workpiece by rotation of handle assembly 56.

When it is desired to bevel the workpiece, the cross-feed is first retracted and the second portion 20 of the table top is moved to the angular position corresponding to the degree of bevel desired. By sliding the workpiece along the fence 26, the workpiece will be beveled in the manner shown in FIG. 1. Different bevel angles can, of course, be achieved by simply changing the angular position of the second portion of the table top relative to the first portion thereof.

When the apparatus is used with the table in the 90 degree position shown in FIG. 6, the router bit will most often be below the workpiece although it can be raised above the workpiece by operation of the feed means to move the cutter toward the retracted position. Preliminarily to making cuts on the workpiece, the router depth adjustment is used to position the tip of the cutting edge of the cutting bit 14 into initial contact with the workpiece held against the fence. This establishes the zero depth setting. By adjusting the router depth forwardly relative to the workpiece, the desired depth of cut can be achieved.

When cutting below the workpiece, the cross-feed mechanism is used to lower the cutter below the table surface and then adjusted so that the top edge of the cutter contacts the workpiece. At this point, the calibrated cross-feed reading can be taken and recorded as the zero starting position. The cutter can be raised relative to the workpiece by retracting the cross-feed to a desired setting for the first pass of the workpiece along the fence 26. After the first pass is completed, the cross-feed can be adjusted upward, i.e., retracted, in order to accomplish the next cut of the workpiece. This procedure is repeated until the final cut is made.

With the apparatus in the 90 degree position shown in FIG. 6, a number of difficult operations can be accomplished safely and easily with the workpiece always laying flat on the table. Examples of operations that can be accomplished with the router table in the 90 degree position include the forming of raised panels which is done with a vertically raised panel bit, and the cutting of large profile moldings, rabbits, mortise and tenons, splining, tongue and groove and various other types of joinery.

A study of the drawings and an analysis of the use of both the angular adjustments and the cross-feed adjustment of the apparatus make it clear that a large number of new, different and distinct profiles can be cut on the workpiece using cutter bits of standard configuration. As these new and different profiles are cut, recordings can be conveniently made of both the angular position of the cutter bit and the cross-feed positions so that the distinct profiles can be repeated at a later date.

As previously mentioned, during all cutting operations, the combination guard and dust collector means of the apparatus will automatically position itself over the rotating cutter bit in a manner to prevent accidental engagement with the cutter bit and also to collect particulate matter generated during the cutting operations and carry the particulate matter safely away to the remotely located vacuum unit.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:
1. A routing apparatus comprising:
  (a) a router having a rotating cutting bit;
  (b) a router support assembly for supporting said router comprising:
    (i) a generally planar top having first and second portions, said second portion having opposing faces and an opening for receiving said cutting bit therethrough, said second portion being angularly movable relative to said first portion between first and second angular positions; and
    (ii) mounting means carried by said second portion of said top for mounting said router thereto with said cutting bit extending through said opening, said mounting means comprising:
      a. feed means for controllably moving said cutting bit from a first position to a second position; and
      b. connector means for removably connecting said router to said second portion of said table, said connector means including a pair of spaced-apart guide rails connected to one of said opposing faces; and a router mounting plate slidably supported between said guide rails.
2. An apparatus as defined in claim 1 in which said feed means comprises:
  (a) a threaded bracket connected to said router mounting plate;
  (b) a feed screw connected to said top and being threadably receivable within said threaded bracket; and
  (c) a handle connected to said feed screw for rotating said fed screw relative to said threaded bracket.
3. An apparatus as defined in claim 2 in which said second portion of said table top is provided with a viewing aperture and in which said measuring means comprises a calibrated scale mounted on said router mounting plate proximate said viewing aperture.
4. A routing apparatus comprising a router having a rotating cutting bit and a router support assembly for supporting said router, said router support assembly comprising:
  (a) a generally planar top having first and second hingeably connected portions, said second portion having an upper surface, a lower surface and an opening for receiving said cutting bit therethrough, said second portion being angularly movable relative to said first portion between first position wherein said first and second portions are substantially co-planar and a second position wherein said first and second portion are substantially perpendicular;

(b) mounting means connected to said lower surface of said second portion of said top for mounting said router thereto with said cutting bit extending through said opening, said mounting means comprising:

(i) a pair of spaced-apart guide rails connected to said lower surface of said second portion; and (ii) a router mounting plate slidably supported between said guide rails, said plate having an aperture for receiving said cutting bit therethrough.

5. An apparatus as defined in claim 4 further including feed means for moving said router mounting plate relative to said second portions, said feed means comprising:

(a) a threaded bracket connected to said router mounting plate;

(b) a feed screw connected to said second portion of said top and being threadably receivable within said threaded bracket; and (c) a handle connected to said feed screw for rotating said feed screw relative to said threaded bracket.

6. An apparatus as defined in claim 4 further including measuring means for measuring the angle between said first and second portions of said top.

7. An apparatus as defined in claim 4 further including an elongated fence connected to said first portion of said top.

8. An apparatus as defined in claim 4 further including dust collecting means connected to said second portion of said top for collecting saw dust generated by said cutting bit.

9. An apparatus as defined in claim 8 in which said dust collecting means comprises:

(a) a hollow housing slidably connected to said upper surface of said second portion of said top; and (b) biasing means for urging said housing continuously toward said first portion of said top.

10. A router table for removably supporting a portable router of the character having a rotating cutter and adjustment means for adjusting the depth of cut of the cutter bit, said router table comprising:

(a) a generally planar top having a work supporting first portion and a second portion hingeably connected to said first portion for angular movement with respect thereto, said second portion having an opening for receiving the rotating cutter therethrough; and (b) mounting means carried by said second portion of said top for mounting the portable router thereto with the cutting bit extending through said opening, said mounting means including guide means connected to said second portion for guiding movement of said router relative to said second portion and router support means connected to said guide means for supporting the router, said mounting means further including feed means for controllably moving the router toward and away from said work supporting surface first portion of said top.

11. An apparatus as defined in claim 10 in which said feed means includes measuring means for measuring the extent of travel of said router toward and away from said work supporting first portion of said top.

12. An apparatus as defined in claim 10 in which said second portion of said top is movable through an angle of 90 degrees.

13. An apparatus as defined in claim 10 further including measuring means for measuring the angle between said first and second portions of said top.

14. An apparatus as defined in claim 10 further including combination guard and dust collecting means for guarding the rotating cutter and for collecting particulates generated by the cutter cutting the workpiece.

15. A routing apparatus comprising a router having a rotating cutting bit and a router support assembly for supporting said router, said router support assembly comprising:

(a) a top having first and second hingeably connected portions, said second portion having an upper surface, a lower surface and an opening for receiving said cutting bit therethrough, said second portion being angularly movable relative to said first portion between first position and a second position;

(b) mounting means connected to said second portion of said top for mounting said router thereto with said cutting bit extending through said opening, said mounting means comprising:

(i) guide means connected to said second portion for guiding movement of the router relative to said second portion; and (ii) router support means for supporting the router, said support means being slidably supported by said guide means.

16. An apparatus as defined in claim 15 in which said guide means comprises a pair of spaced-apart guide rails connected to said second portion of said top.

17. An apparatus as defined in claim 16 in which said router support means comprises a mounting plate receivable between said guide rails.

18. An apparatus as defined in claim 16 in which said mounting means further includes feed means for controllably moving said cutter bit.

* * * * *